(12) United States Patent
Hagelskamp

(10) Patent No.: US 8,894,546 B2
(45) Date of Patent: Nov. 25, 2014

(54) ELECTRO-HYDRAULIC CONTROL INCLUDING BLOCKING FEATURES FOR MULIT-SPEED AUTOMATIC TRANSMISSION

(71) Applicant: Bryan Hagelskamp, Carmel, IN (US)

(72) Inventor: Bryan Hagelskamp, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/891,823

(22) Filed: May 10, 2013

(65) Prior Publication Data

US 2013/0239730 A1 Sep. 19, 2013

Related U.S. Application Data

(63) Continuation of application No. 12/563,235, filed on Sep. 21, 2009, now Pat. No. 8,439,804.

(60) Provisional application No. 61/109,005, filed on Oct. 28, 2008.

(51) Int. Cl.
*F16H 61/26* (2006.01)
*F16H 61/00* (2006.01)
*F16H 61/02* (2006.01)
*F16H 61/12* (2010.01)
*F16H 59/68* (2006.01)

(52) U.S. Cl.
CPC .... *F16H 61/0021* (2013.01); *F16H 2061/1224* (2013.01); *F16H 2059/683* (2013.01); *F16H 61/12* (2013.01); *F16H 2061/1204* (2013.01); *F16H 61/0206* (2013.01)
USPC ........................................ 477/131

(58) Field of Classification Search
USPC ................. 477/143, 127, 130, 131, 155, 147; 475/128
See application file for complete search history.

(56) References Cited

U.S. PATENT DOCUMENTS

| | | | |
|---|---|---|---|
| 4,070,927 | A | 1/1978 | Polak et al. |
| 4,298,105 | A | 11/1981 | Duhaime |
| 5,445,043 | A | 8/1995 | Eaton et al. |
| 5,882,278 | A | 3/1999 | Takiguchi |
| 6,464,609 | B1 | 10/2002 | Bai et al. |
| 6,488,610 | B2 | 12/2002 | Micklash et al. |
| 6,712,725 | B2 | 3/2004 | Uchino |
| 7,410,438 | B2 | 8/2008 | Moehlmann et al. |
| 2002/0151400 | A1 | 10/2002 | Bai et al. |
| 2006/0046897 | A1 | 3/2006 | Mohlmann et al. |
| 2008/0045373 | A1 | 2/2008 | Rodgers, II |
| 2010/0029431 | A1 | 2/2010 | Rodgers, II |
| 2010/0105522 | A1 | 4/2010 | Hagelskamp |
| 2011/0303040 | A1 | 12/2011 | Hagelskamp |

*Primary Examiner* — Saul Rodriguez
*Assistant Examiner* — David J Hlavka
(74) *Attorney, Agent, or Firm* — Barnes & Thornburg LLP

(57) ABSTRACT

A control for a multi-speed automatic vehicle transmission is provided. Electrical and hydraulic components are provided, including pressure control or "trim" valve systems in fluid communication with shift valves and electrohydraulic actuators to selectively engage and disengage the transmission clutches or other shift mechanisms. Pressure switches are provided for the trim valves and shift valves. The fluid connections between the trim valve systems and the shift valve systems are configured to reduce the total number of valves and fluid passages required and to reduce the size of at least one of the valves. Clutch blocking features are provided. Power off limp home and reduced engine load at stop features are provided in all forward ranges, and control of double transition shifts is also provided.

20 Claims, 6 Drawing Sheets

ELECTRO-HYDRAULIC CONTROL INCLUDING BLOCKING FEATURES FOR MULIT-SPEED AUTOMATIC TRANSMISSION

CROSS-REFERENCE

This application is a continuation application of and claims priority to U.S. application Ser. No. 12/563,235, entitled "ELECTRO-HYDRAULIC CONTROL INCLUDING BLOCKING FEATURES FOR MULTI-SPEED AUTOMATIC TRANSMISSION," which was filed on Sep. 21, 2009 and which claims the benefit of and priority to U.S. Provisional Patent Application No. 61/109,005, filed on Oct. 28, 2008, both of which are incorporated herein by this reference in their entirety.

TECHNICAL FIELD

The present invention relates generally to automatic transmissions for automotive vehicles, and more particularly, to an electro-hydraulic control for a multi-speed automatic transmission.

BACKGROUND

Many types of multi-speed automatic transmissions are available for motor vehicles. In automatic transmissions, shifts from one operating mode, range, or ratio to another operating mode, range or ratio may be controlled electronically by computer circuitry, programming logic, and fluid hydraulics installed in the vehicle. In general, an assembly of electro-hydraulic actuators (such as solenoids), hydraulic valves and fluid passages makes up an electro-hydraulic portion of the transmission control system. Electrical controls selectively actuate hydraulic valves, which control the pressure and direction of hydraulic fluid flow applied to torque transmitting mechanisms (such as clutches, brakes and the like) and other components of the transmission. The clutches or other torque transmitting mechanisms may be engaged and disengaged upon command to attain different operating modes, ranges or ratios for the vehicle.

Some of the design considerations of control systems for automatic transmissions include shift quality, fuel economy, reliability and durability over a wide range of potential operating conditions. The range of operating conditions may include changes in the weight of the vehicle load, operating temperature, weather conditions, geographic conditions (such as altitude or humidity), and driver preferences. The configurations of component parts of the transmission and/or the control system may vary. Variations may also occur in the reliability, durability and/or manufacturing tolerances of component parts of the transmission and/or control system.

In some instances, if a failure of a component occurs during vehicle operation, the transmission control system may include features that are designed to cause the vehicle to transition to a safer or more desirable state until the failure can be addressed. Certain of such features may be referred to as "limp home" capabilities. In other instances, it may be desirable or necessary to prevent the transmission from causing the vehicle to enter an operating mode that is known or believed to be undesirable or unsafe during operation. Certain of such features may be referred to as "blocking" features. In the past, these and other design features have often required additional space in the transmission assembly.

SUMMARY

According to one aspect of the present invention, an electrohydraulic control for a multi-speed vehicle transmission, such as a countershaft transmission, is provided. The control includes a pressure control subassembly. The pressure control subassembly includes a plurality of pressure control valves including a first pressure control valve and a first electrohydraulic actuator operably coupled to the first pressure control valve. The control also includes a shift valve subassembly. The shift valve subassembly includes a plurality of shift valves including a first shift valve and a first pressure switch operably coupled to the first shift valve. The control also includes a fluid connection connecting the first electrohydraulic actuator directly with the first pressure switch.

The first electrohydraulic actuator may be a normally high solenoid. The control may include a second electrohydraulic actuator operably coupled to the first shift valve. The second electrohydraulic actuator may be a normally high solenoid.

The control may include an electrical control including computer circuitry, wherein the electrical control is operably coupled to at least the first electrohydraulic actuator, and the fluid connection is configured to block control of the first pressure control valve by the electrical control when the first pressure switch is not activated.

The fluid connection may be configured to enable control of the first pressure control valve by the electrical control only when the first pressure switch is activated. The first pressure switch may be configured to indicate a shift of the transmission into a forward speed ratio when the first pressure switch is activated.

According to another aspect of the present invention, an electrohydraulic control for a multi-speed vehicle transmission, such as a countershaft transmission, is provided. The control includes a pressure control subassembly. The pressure control assembly includes a plurality of pressure control valves including a first pressure control valve and a first electrohydraulic actuator operably coupled to the first pressure control valve. The control also includes a shift valve subassembly. The shift valve subassembly includes a plurality of shift valves including first and second shift valves, a first fluid connection directly connecting the first shift valve to the second shift valve, and a first pressure switch operably coupled to the first shift valve and in fluid communication with the first fluid connection, and a second fluid connection connecting the first electrohydraulic actuator with the first fluid connection through the second shift valve.

The first electrohydraulic actuator may be a normally low solenoid. The control may include a second electrohydraulic actuator operably coupled to the first shift valve and a third electrohydraulic actuator operably coupled to the second shift valve. The second electrohydraulic actuator may be a normally low solenoid and the third electrohydraulic actuator may be a normally high solenoid.

The control may include an electrical control including computer circuitry, wherein the electrical control is operably coupled to at least the first electrohydraulic actuator, and the first and second fluid connections are configured to block control of the first pressure control valve by the electrical control when the first pressure switch is not activated.

The first and second fluid connections may be configured to enable control of the first pressure control valve by the electrical control only when the first pressure switch is activated. The first and second fluid connections may be configured to block application of a torque transmitting mechanism of the transmission when the transmission is in a high forward speed ratio.

According to another aspect of the present invention, a control for a multi-speed vehicle transmission, such as a countershaft transmission, is provided. The control includes a pressure control subassembly, comprising a plurality of pressure control valves including a first pressure control valve, a first electrohydraulic actuator operably coupled to the first pressure control valve, a second pressure control valve, and a second electrohydraulic actuator operably coupled to the second pressure control valve. The control also includes a shift valve subassembly, comprising a plurality of shift valves including first, second and third shift valves, a first pressure switch operably coupled to the first shift valve and a second pressure switch operably coupled to the third shift valve. The control also includes means for blocking activation of the first pressure control valve unless the first pressure switch is activated, and means for blocking activation of the second pressure control valve unless the second pressure switch is activated.

The pressure control subassembly and the shift valve subassembly may be in fluid communication with a plurality of selectively engageable torque transmitting mechanisms of the transmission. The means for blocking activation of the first pressure control valve may selectively block application of a first torque transmitting mechanism. The means for blocking activation of the first pressure control valve may prevent the first torque transmitting mechanism from being applied when the transmission is not in a forward speed ratio. The means for blocking activation of the second pressure control valve may selectively block application of a second torque transmitting mechanism. The means for blocking activation of the second pressure control valve may prevent the second torque transmitting mechanism from being applied when the transmission is in a high forward speed ratio.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

The figures depict schematic illustrations. As such, the components may not be drawn to scale, and lines shown as connecting the various blocks and components shown therein represent connections which, in practice, may include one or more electrical, mechanical and/or fluid connections, passages, communication links, couplings or linkages, as will be understood by those skilled in the art and as described herein. In general, like structural elements on different figures refer to identical or functionally similar structural elements, although reference numbers may be omitted from certain views of the drawings for ease of illustration.

DETAILED DESCRIPTION

Aspects of the present invention are described with reference to illustrative embodiments shown in the accompanying drawings and described herein. While the present invention is described with reference to these illustrative embodiments, it should be understood that the present invention as claimed is not limited to the disclosed embodiments.

According to the present invention, one or more blocking features are incorporated into the transmission control system. These features are generally designed to prevent certain clutches or other torque transmitting mechanisms from engaging while certain operating conditions are present, in order to protect the safety of the vehicle operator, provide easier or more reliable shifting, or for other reasons. These features may be incorporated into a transmission alone or in combination with other control features, including but not limited to limp home capabilities and reduced engine load at stop (RELS) capabilities.

Figure 1:
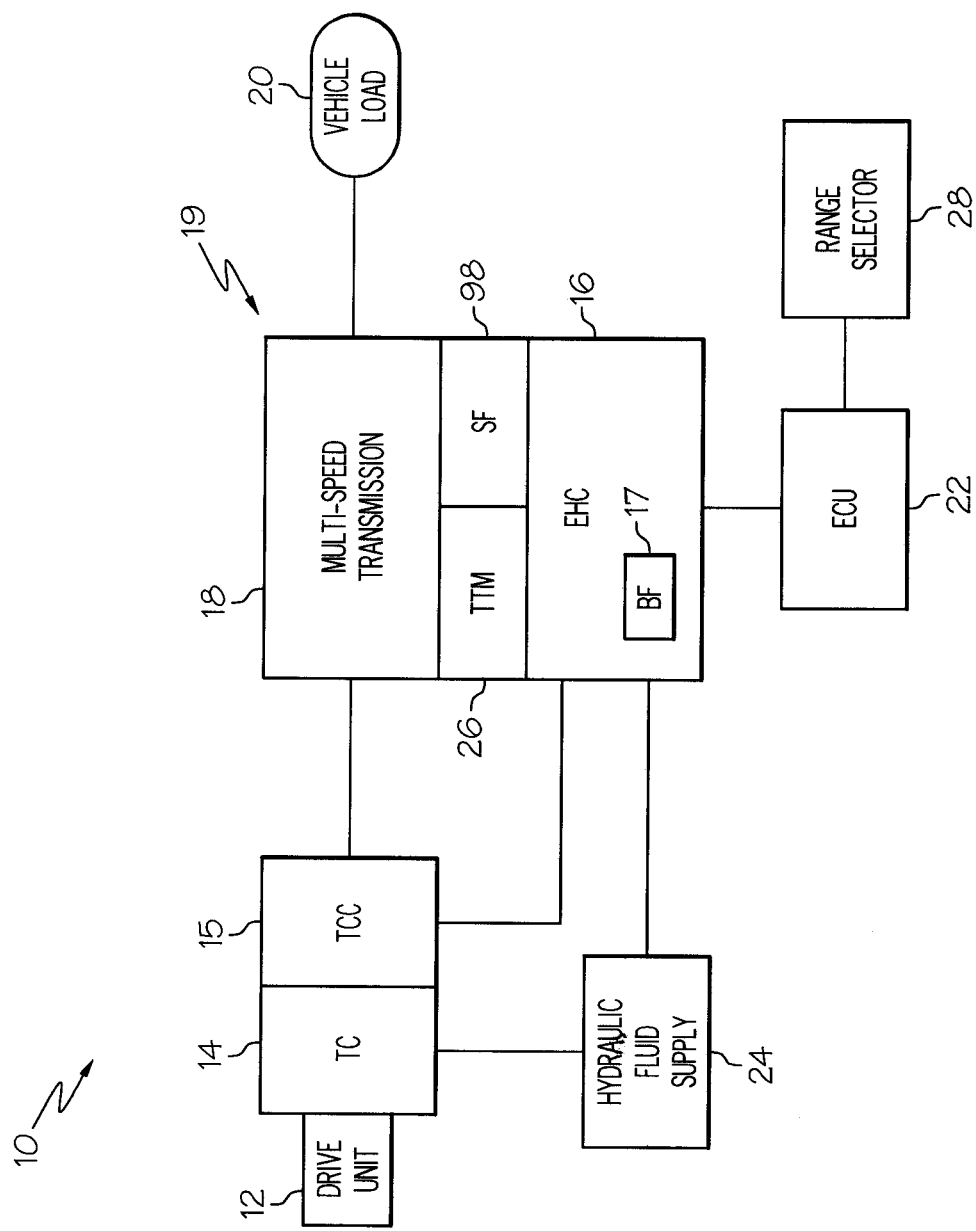
FIG. 1 is a simplified block diagram of an electro-hydraulic control for a multi-speed automatic transmission, including one or more blocking features, shown in the context of an exemplary vehicle powertrain.

In the illustrated embodiment, an electro-hydraulic control 16 for an automatic vehicle transmission is provided. Control 16 includes one or more blocking features 17. In FIG. 1, control 16 is shown in the context of an exemplary powertrain 10 of an automotive vehicle. In general, powertrain 10 includes a drive unit 12, a torque transferring apparatus 14, a multi-speed automatic transmission 19, and a torque transmitting mechanism 15 interposed between torque transferring apparatus 14 and transmission 19.

Drive unit 12 provides a torque output to torque transferring apparatus 14. Drive unit 12 may be an internal combustion engine of a compression-ignition type (i.e. diesel) or a spark-ignition type (i.e. gasoline), a hybrid or engine-electric motor combination, or the like.

Torque transferring apparatus 14 selectively establishes a coupling between drive unit 12 and transmission 19 to convert and/or transfer torque output from drive unit 12 to transmission 19. Torque transferring apparatus 14 is normally a fluid coupling, such as a torque converter or similar apparatus. As is well known, torque converters generally include a torque converter pump, turbine, and stator.

Torque transferring apparatus 14 is equipped with at least one torque transmitting mechanism 15. In the illustrated embodiment, torque transmitting mechanism 15 includes a torque converter clutch, which is engageable to effect unitary rotation of the torque converter pump and turbine in response to reduced hydraulic pressure within the torque transmitting mechanism 15, which may occur when "slip" (i.e., a difference in rotational speed) between the torque converter pump and turbine is not required. In other embodiments, torque transmitting mechanism 15 may include an optional pump clutch (not shown), which may selectively alter the coupling between drive unit 12 and torque transferring apparatus 14 to provide improved fuel economy or for other reasons.

Transmission 19 generally includes an input shaft, an output shaft, an assembly of gears 18, a plurality of gear-shifting torque transmitting mechanisms 26, and a shift fork 98. Gear assembly 18 generally includes a plurality of intermeshing gear sets that are concentric with and/or rotatable about one or more gear shafts. In the illustrated embodiment, gear assembly 18 includes a main shaft, at least one countershaft, and a plurality of gears rotatable about or with the main shaft or countershaft(s). One exemplary embodiment of gear assembly 18 is shown by the schematic located in U.S. Provisional Patent Application Ser. No. 61/109,005, which is incorporated herein by reference. In that embodiment, gear assembly 18 includes a main shaft, a pair of countershafts, a plurality of main shaft gears rotatable about or with the main shaft, a plurality of countershaft gears rotatable about or with each of the countershafts, a synchronizer or dog clutch, and a planetary gear set disposed about the main shaft.

Gear-shifting torque transmitting mechanisms (or "shift mechanisms") 26 are selectively engageable and disengageable by electro-hydraulic control 16 to cause the vehicle to engage or release certain gears to assume one of a plurality of operational modes, ranges, or ratios. As such, they are configured to selectively achieve a mechanical, fluid or friction coupling between components of powertrain 10 in response to inputs, conditions or changes in conditions. One or more of these elements may be friction devices or fluid-operated devices such as clutch- or brake-type devices. One or more of these elements may be stationary- or rotating-type devices. In general, each of the torque transmitting mechanisms 15, 26 are operable independently of the other.

Shift fork 98 is operable to select or change the direction of operation of the vehicle. Shift fork 98 may have at least a reverse ('R') position, a neutral ('N') position, and a forward ('F') position. In the illustrated embodiment, changing the physical or mechanical position of shift fork 98 causes control 16 to bring on the appropriate gearset to move the vehicle in the requested direction, i.e., either forward or reverse. The position of shift fork 98 may be changed (i.e., from 'R' to 'F' or vice versa) by action of the vehicle operator or may be electronically controlled (e.g., in response to signals received by control 22 from range selector 28).

Torque transmitting mechanisms 15 and 26 and shift fork 98 include fluid passages or chambers that are in fluid communication with hydraulic control elements of control 16 as shown in FIGS. 2-5 and described below.

The embodiment of transmission 19 shown in U.S. Provisional Patent Application Ser. No. 61/109,005 provides an automatic countershaft transmission having seven gear-shifting torque transmitting mechanisms (e.g., C1, C2, C3, C4, C5, C6, C7), a shift fork, and a rear planetary gearset arranged to provide two reverse ranges, ten forward ranges, and a neutral range. In that embodiment, six of the gear-shifting torque transmitting mechanisms (e.g., C1, C2, C3, C4, C5, C7) are rotating clutches, one of the gear-shifting torque transmitting mechanisms (e.g., C6) is a stationary clutch, and the shift fork is a two-position shift fork. A ratio table showing the gear ratios, steps, and clutches applied in each range is provided in U.S. Provisional Patent Application Ser. No. 61/109,005.

Another exemplary countershaft transmission is disclosed in Rodgers II, U.S. patent application Ser. No. 12/182,393, filed Jul. 30, 2008. These and other countershaft transmissions may have certain advantages, such as lower spin losses than planetary transmissions and/or greater ratio coverage. However, countershaft transmissions typically require more clutches than planetary designs, and some clutches may be "reused" for different ranges. Also, countershaft transmissions may require a shift fork to operate a synchronizer. These or other complexities may make it more challenging to implement appropriate failure mode responses in countershaft transmissions while maintaining desired operational features, such as double transition or "skip" shifts.

While certain aspects of the present invention are discussed herein in the context of a countershaft transmission, and may be directed to one or more of the issues mentioned above, it will be understood by those skilled in the art that aspects of the present invention are applicable to other types and configurations of transmissions.

Transmission 19 applies torque to vehicle load 20. Vehicle load 20 generally includes the drive wheels and driven load mass. The actual weight of vehicle load 20 may be quite considerable and/or vary widely over the course of the vehicle's use, as may be the case with commercial vehicles such as trucks, buses, emergency vehicles, and the like.

Electronic or electrical control 22 is operably coupled to electro-hydraulic control 16 and range selector 28 by insulated wiring, wireless links, or other suitable connections for exchanging data, communications and computer instructions. Control 22 includes computer circuitry configured to control operation of transmission 19 based on inputs from one or more components of powertrain 10, such as drive unit 12, torque transferring apparatus 14, control 16, transmission 19, range selector 28, and/or other components. Such inputs may include digital and/or analog signals received from sensors, controls or other like devices associated with the vehicle components. For instance, inputs may include signals indicative of transmission input speed, driver requested torque, engine output torque, engine speed, temperature of the hydraulic fluid, transmission output speed, turbine speed, brake position, gear ratio, torque converter slip, fluid pressure, and/or other measurable parameters. Control 22 processes these inputs and parameters and issues electrical control signals to various components of electro-hydraulic control 16.

While shown schematically in FIG. 1 as a single block 22, it will be understood by those skilled in the art that portions of control 22 may be implemented as separate logical or physical structures. For example, electronic or electrical controls for transmission 19 may be physically and/or logically separated from electronic or electrical controls for drive unit 12.

Range selector 28 enables selection of an operational range, mode, or ratio by a vehicle operator. Available ranges, modes or ratios may include one or more reverse speed ratios, a plurality of forward speed ratios, neutral, park, four-wheel drive, all-wheel drive, snow, trailer, and other modes. As such, range selector 28 may include one or more push buttons, levers, or similar actuators that are selectable by a person in the vehicle. In response to a selection, range selector 28 issues a signal indicative of the selected range, mode or ratio. In the illustrated drive-by-wire system, range selector 28 issues an electrical signal to control 22. In other embodiments including a manual valve selector, range selector 28 issues a hydraulic pressure signal to control 16.

Fluid supply 24 provides pressurized hydraulic fluid for use by torque transferring mechanism 14 and electro-hydraulic control 16. In the illustrated embodiment of FIGS. 2-5, fluid supply 24 includes a main pump 81, a lube pump 82, and a sump or reservoir 84. During operation of the vehicle, pumps 81, 82 draw hydraulic fluid from sump or reservoir 84 and supply it to fluid circuits and valve systems of control 16 as described below.

In general, control 16 is configured for use with a transmission that can provide at least one reverse range, a neutral range, and a plurality of forward ranges. In the illustrated embodiment, control 16 is configured for use with a transmission wherein two gear-shifting torque transmitting mechanisms (or "shift mechanisms") are engaged in each forward range and in each reverse range, and one shift mechanism is engaged in a neutral range.

As noted above, to illustrate the present invention, features and aspects of control 16 are described herein in the context of an automatic countershaft transmission, particularly a countershaft transmission having seven clutches, a shift fork, and a rear planetary gearset arranged to provide two reverse ranges, ten forward ranges, and a neutral range. It will be understood by those skilled in the art, however, that features and aspects of the present invention may be incorporated into controls for other transmission types and configurations.

According to the embodiment shown in FIGS. 2-5, control 16 includes a pressure control or "trim control" subsection or subassembly 196, and a multiplexing or flow control subsection or subassembly 198. Trim control subsection 196 and flow control subsection 198 are in fluid communication with fluid supply 24 and with each other via a plurality of fluid circuits including a main pressure fluid circuit 202, a control main pressure fluid circuit 204, a cooler/lube circuit 206, an exhaust circuit 208, and an exhaust backfill fluid circuit 210. Fluid circuits 204, 206, 208 and 210 are operably coupled to fluid supply 24 as shown. Subsections 196, 198 and fluid circuits 202, 204, 206, 208, 210 include a plurality of valve systems, fluid passages and fluid chambers that are provided in a valve body housing or casing, which is installable in a vehicle as is known in the art.

As described below, certain of the fluid connections between trim control subsection 196 and flow control section 198 of control 16 are configured to reduce the total number of valves and fluid passages required by control 16 to operate transmission 19 in a failure or safety mode. Some of the fluid passage configurations are designed to reduce the size of at least one of the hydraulic valves. Reducing the valve sizes may reduce the amount of space required by electro-hydraulic control 16 in the transmission assembly.

Additionally, certain of the electro-hydraulic controls are multiplexed to provide clutch blocking features more efficiently as explained below. Power off limp home and reduced engine load at stop features may be provided in all forward ranges, and complete control of double transition shifts may also be provided by control 16.

Figure 2:
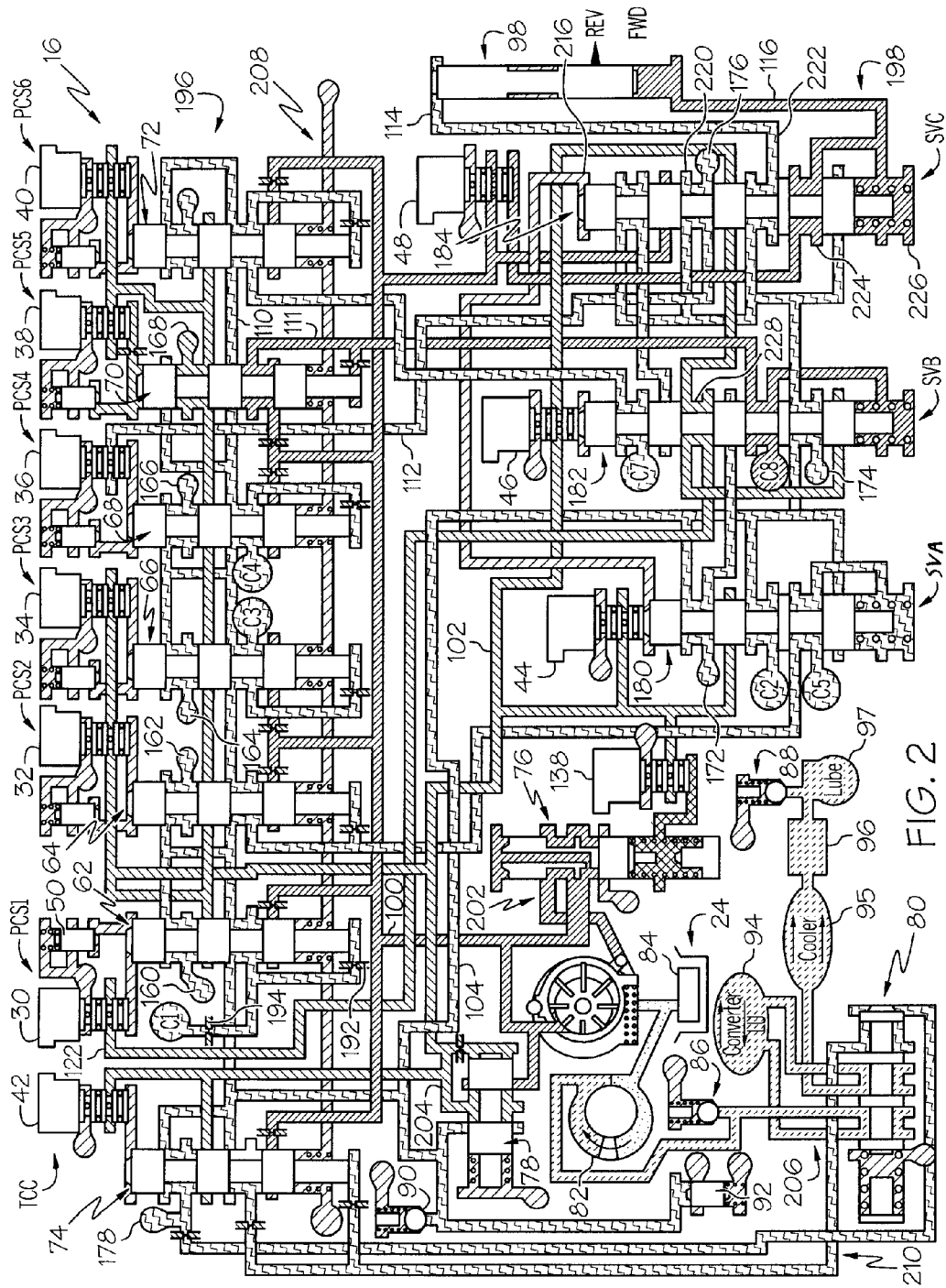
FIG. 2 is a schematic diagram of one embodiment of the electro-hydraulic control of FIG. 1, showing a configuration of fluid passages and fluid pressures for a neutral range.

Referring to FIG. 2, trim control subsection 196 includes a plurality of trim systems TCC, PCS1, PCS2, PCS3, PCS4, PCS5, PCS6; and flow control subsection 198 includes a plurality of shift valve systems SVA, SVB, SVC. Main pressure circuit 202 supplies hydraulic fluid at a main pressure directly to trim systems TCC, PCS1, PCS2, PCS3, PCS4, PCS5, PCS6, via a main passage 100. Main pressure circuit 202 also supplies hydraulic fluid at a main pressure directly to actuator 48 and shift valve 184 of shift valve system SVC, via main passage 100.

In the illustrated embodiment, fluid pressure supplied to main passage 100 is regulated by a main regulator valve 76 and a main modulator valve 138. In general, the main pressure is defined by a range including a minimum system pressure and a maximum system pressure for main passage 100. In the illustrated embodiment, the main pressure is in the range of about 50-250 pounds per square inch (psi).

Main passage 100 is also in fluid communication with a control main regulator valve 78, which provides hydraulic fluid at a control pressure to control main circuit 204. Control main fluid circuit 204 provides control pressure directly to actuator 42 of trim system TCC, actuator 32 of trim system PCS2, and actuators 44 and 46 of shift valve systems SVA and SVB, via control passage 102. The control pressure is generally less than the main pressure. In the illustrated embodiment, the control pressure is in the range of about 110 psi.

Main modulator 138 is operably coupled to electronic or electrical control 22 to modulate or control the fluid pressure level in main pressure circuit 202 and control pressure circuit 204 as transmission modes, ranges, ratios or operating conditions change. In the illustrated embodiment, main modulator 138 is a normally high solenoid valve with an output pressure varying in the range of about 0-110 psi.

Cooler/lube circuit 206 includes a pump 82. Pump 82 distributes fluid to torque converter fluid chamber 94 and cooler fluid chamber 95 via converter flow valve 80 and converter relief valve 86. In the illustrated embodiment, a lube filter 96, lube fluid chamber 97 and lube relief valve 88 are in fluid communication with cooler fluid chamber 95. In general, cooler/lube circuit 206 is operable to provide fluid pressure to torque transferring apparatus 14, maintain the temperature of the hydraulic fluid within a suitable temperature range, and to lubricate various components of transmission 19, such as components of the gear sets including gears and bearings. In the illustrated embodiment, the operating temperature of the hydraulic fluid is in the range of about −40 degrees Celsius to about +120 degrees Celsius.

The fluid pressure in cooler/lube circuit 206 is generally less than the main pressure. In the illustrated embodiment, this pressure is in the range of about 100 psi. During "normal" operation in which pumps 81, 82 are drawing fluid from reservoir 84, fluid in suction passage 83 is at a negative pressure. In the illustrated embodiment, the negative pressure is in the range of about −2 psi. Converter relief valve 86 prevents overpressure of torque transferring apparatus 14, during a cold startup, for example.

Exhaust circuit 208 is in fluid communication with valves and actuators of control 16 as shown in FIGS. 2-5. Exhaust pressure is in the range of about zero psi. Exhaust backfill circuit 210 is operably coupled to converter flow valve 80 and to the valves of control 16 via backfill passage 104 as shown. In the illustrated embodiment, exhaust backfill circuit 210 includes an EBF relief valve 90 and an EBF regulator valve 92. Exhaust backfill circuit 210 provides an exhaust backfill pressure, which is generally a pressure to prevent air from entering torque transmitting mechanisms 15, 26 when they are exhausted. In the illustrated embodiment, the exhaust backfill pressure is in the range of about 2 psi.

In general, each of the trim systems TCC, PCS1, PCS2, PCS3, PCS4, PCS5, PCS6, and flow control systems SVA, SVB and SVC includes an electro-hydraulic actuator, a hydraulic valve, a pressure switch, and fluid passages and/or chambers. In the illustrated embodiment, an accumulator, such as accumulator 50 of trim system PCS1, is in fluid communication with each of the trim systems PCS1, PCS2, PCS3, PCS4, PCS5, PCS6 as shown. Such accumulators or similar devices may be used to hydraulically filter step changes in the output pressure of the respective actuators, or for other purposes. However, it will be understood by those skilled in the art that the inclusion of such accumulators is considered optional.

The electro-hydraulic actuators 30, 32, 34, 36, 38, 40, 42, 44, 46, 48, 138 are operably coupled to control 22 to receive electrical signals (i.e. current) therefrom and selectively actuate their respective valves 62, 64, 66, 68, 70, 72 74, 76, 180, 182, 184, to attain, maintain, or transition between the various operational modes, ranges or ratios of transmission 18. However, for ease of illustration, logical representations of these electrical connections to control 22 have been omitted from FIGS. 2-5.

Each of actuators 30, 32, 34, 36, 38, 40, 42, 44, 46, 48, 138 may be a solenoid valve of an on/off or variable bleed type. In the illustrated embodiment, actuators 44, 46, and 48 are on/off solenoids, while actuators 30, 32, 34, 36, 38, 40, and 138 are of the variable bleed or similar type.

Each of actuators 30, 32, 34, 36, 38, 40, 42, 44, 46, 48, 138 is either of the normally low type or of the normally high type. A normally low (or normally off) solenoid valve provides maximum output pressure when it receives electrical input and provides zero or minimum output pressure when no electrical input is received. For normally low solenoids, when control 22 provides little or no electrical input to the actuator, the output pressure of the actuator is zero, nearly zero psi, or, for VBS solenoids, the output pressure is the exhaust backfill (EBF) pressure.

A normally high (or normally on) solenoid valve provides maximum output pressure when it is not receiving any electrical input and provides zero or minimum output pressure when electrical input is provided. For normally high solenoids, when control 22 provides little or no electrical input to the actuator, the output pressure of the actuator is at or near the input pressure. When control 22 supplies electrical input to the actuator, the output pressure of the actuator is zero or nearly zero psi, or for VBS solenoids, the EBF pressure.

Thus, as used herein, when referring to an actuator or solenoid valve as being "actuated," this means either that electrical input is supplied to the solenoid (as in the case of normally low solenoids) or that electrical input is not supplied to the solenoid (as in the case of normally high solenoids). In the illustrated embodiment, actuators 36, 38, 46, 48 and 138 are normally high solenoids while actuators 30, 32, 34, 40, 42, and 44 are normally low solenoids.

Each actuator has an inlet or actuator feed passage, an exhaust passage, and an actuator output passage. As explained further below, in the illustrated embodiment, all of the actuator feed passages are in direct fluid communication with control passage 102 or main passage 100, except for actuator feed passage 122 of actuator 30 and actuator feed passage 112 of actuator 36.

Each of the actuator output passages is in fluid communication with a hydraulic valve, such that fluid pressure (or the lack thereof) in the actuator output passage may affect the position of the valve. In general, each of the valves of control 16 includes a valve head, a valve spool, at least one valve land interposed between portions of the valve spool or between the valve head and a portion of the valve spool, and a return spring disposed in a spring chamber. Each valve spool is axially translatable in a valve bore in response to changes in fluid pressure or fluid flow through the various passages of control 16. For ease of illustration, the valve bores have been omitted from the figures.

The valve lands each define a diameter that is greater than the diameter defined by the valve spool, such that surfaces of the lands may slidably engage interior surfaces of the valve bore when the valve spool translates within the valve bore. Spool portions between valve lands may selectively connect fluid passages to other fluid passages, or connect fluid passages to fluid chambers, depending on the position of the valve.

Each return spring biases its respective valve in a first, destroked or spring set position. Changes in fluid pressure or fluid flow in selected fluid passages may cause the valve spool to translate within the valve bore, causing the return spring to partially or fully compress or decompress. Certain of the valves, such as shift valves 180, 182, 184, are slidable between the first or destroked or spring set position and a second or stroked or pressure set position, where the second or stroked or pressure set position is one in which the return spring is fully compressed. Others of the valves, such as pressure control or trim valves 62, 64, 66, 68, 70, 72, 74 are configured to assume intermediate positions, in which the return spring is partially compressed, in addition to the first and second positions.

Restrictors or orifices, such as orifices 190, 192, 194 of trim system PCS1, may be located or positioned in various fluid passages to alter or moderate the rate of fluid flow through the fluid passages or a portion thereof, in order to control the rate at which pressure in a fluid passage changes or for other reasons. Such restrictors may be used to provide additional control over fluid pressure or the rate of application thereof in the fluid passages and/or fluid chambers.

In the illustrated embodiment, a pressure switch is in fluid communication with each of the trim valves 62, 64, 66, 68, 70, 72, 74 and each of the shift valves 180, 182, 184. Pressure switches 160, 162, 164, 166, 168, 170, 172, 174, 176, 178 detect pressure changes in their respective valve systems PCS1, PCS2, PCS3, PCS4, PCS5, PCS6, SVA, SVB, SVC, TCC, and produce electrical signals in response to the detected pressure. In this way, pressure switches are used to monitor the position of the valves in the valve systems. In the illustrated embodiment, pressure switches 160, 162, 164, 166, 168, 170, 172, 174, 176, 178 are activated by fluid pressure applied to their respective valves 62, 64, 66, 68, 70, 72, 180, 182, 184, 74, to detect the valve position and provide valve position information to control 22. The pressure switches are thereby used to provide diagnostics to control 22 or for other reasons.

Additionally, other types of sensors may be incorporated into control 16 to determine the position of a control element, monitor a fluid pressure, or for other reasons. For example, a linear position sensor or similar device may be used to detect the position of shift fork 98. As another example, one or more pressure sensors may be deployed in control 16 to monitor fluid pressure (e.g. main pressure, control pressure) for diagnostic purposes and/or for closed-loop control.

If a pressure change is detected at a pressure switch or other sensor, the affected pressure switch or sensor issues an electrical signal to control 22. Such electrical signals inform control 22 of changes in status of components of control 16. In general, pressure switches 160, 162, 164, 166, 168, 170, 172, 174, 176, 178 and other sensors are in electrical or electronic communication with control 22 by suitable electrical wiring, electric networks, and/or wireless channels or links, as will be understood by those skilled in the art. However, for ease of illustration, logical representations of these electrical connections to control 22 have been omitted from FIGS. 2-5.

In the illustrated embodiment, a pressure switch is provided for each trim valve and for each shift valve of control 16. Also, in the illustrated embodiment, the number of pressure switches provided in control 16 is less than the total number of actuators provided in control 16.

Torque transmitting mechanisms 15, 26 each have a fluid chamber, i.e., fluid chambers 94, C1, C2, C3, C4, C5, C6, C7, which is selectively pressurized by operation of control 16. In general, the trim systems TCC, PCS1, PCS2, PCS3, PCS4, PCS5, and PCS6 control the amount and timing of fluid pressure applied to each of the torque transmitting mechanism fluid chambers 94, C1, C2, C3, C4, C5, C6, C7.

Trim system TCC controls application and release of torque converter clutch 15, trim system PCS1 controls application and release of torque transmitting mechanism C1, trim system PCS2 is multiplexed to shift valve system SVA to control application and release of torque transmitting mechanisms C2 and C5, trim system PCS3 controls application and release of torque transmitting mechanism C3, trim system PCS4 controls application and release of torque transmitting mechanism C4, trim system PCS5 controls application and release of torque transmitting mechanism C6, and trim system PCS6 controls application and release of torque transmitting mechanism C7.

For example, activation of the PCS1, PCS3, and PCS4 trim system actuators 30, 34, 36 applies fluid pressure to the C1, C3, and C4 fluid chambers, respectively, thereby resulting in engagement of the respective torque transmitting mechanism 26 (e.g. C1, C3, C4). In the illustrated embodiment, the number of trim systems in control 16 is less than the number of torque transmitting mechanisms in transmission 19.

Flow control systems SVA, SVB, SVC route fluid in control 16 according to the torque transmitting mechanism(s) that are to be applied or released. For example, the position of shift valve 180 determines whether fluid chamber C2 or fluid chamber C5 is in fluid communication with trim system PCS2, and the position of shift valve 182 determines whether fluid chamber C6 or fluid chamber C7 is pressurized. Also, shift valve system SVC is multiplexed to the forward and reverse signals of shift fork 98 through shift valve system SVB as shown in the figures.

In general, control 16 activates and deactivates the various pressure control or trim systems and flow control systems pursuant to a shift schedule. An exemplary shift schedule for the illustrated embodiment is shown in Table 1, below. However, it should be noted that the TCC trim system, which controls engagement and disengagement of the torque converter clutch 15, is operable independently of the gear-shifting trim systems PCS1, PCS2, PCS3, PCS4, PCS5, PCS6, because torque converter clutch 15 is controllable independently of torque transmitting mechanisms 26. Thus, torque converter clutch 15 may be applied or released at any time, including during neutral and reverse.

Blocking features in accordance with the present invention are provided for the PCS1 and PCS4 trim systems. In general, the blocking features described below are provided and controlled by the shift valve systems SVA, SVB, SVC. Fluid passages are arranged between the shift valve systems and the pressure control or trim valve systems so that in certain circumstances, certain of the trim system actuators cannot activate their respective trim valves even if the actuator has been actuated by control 22.

Figure 3:
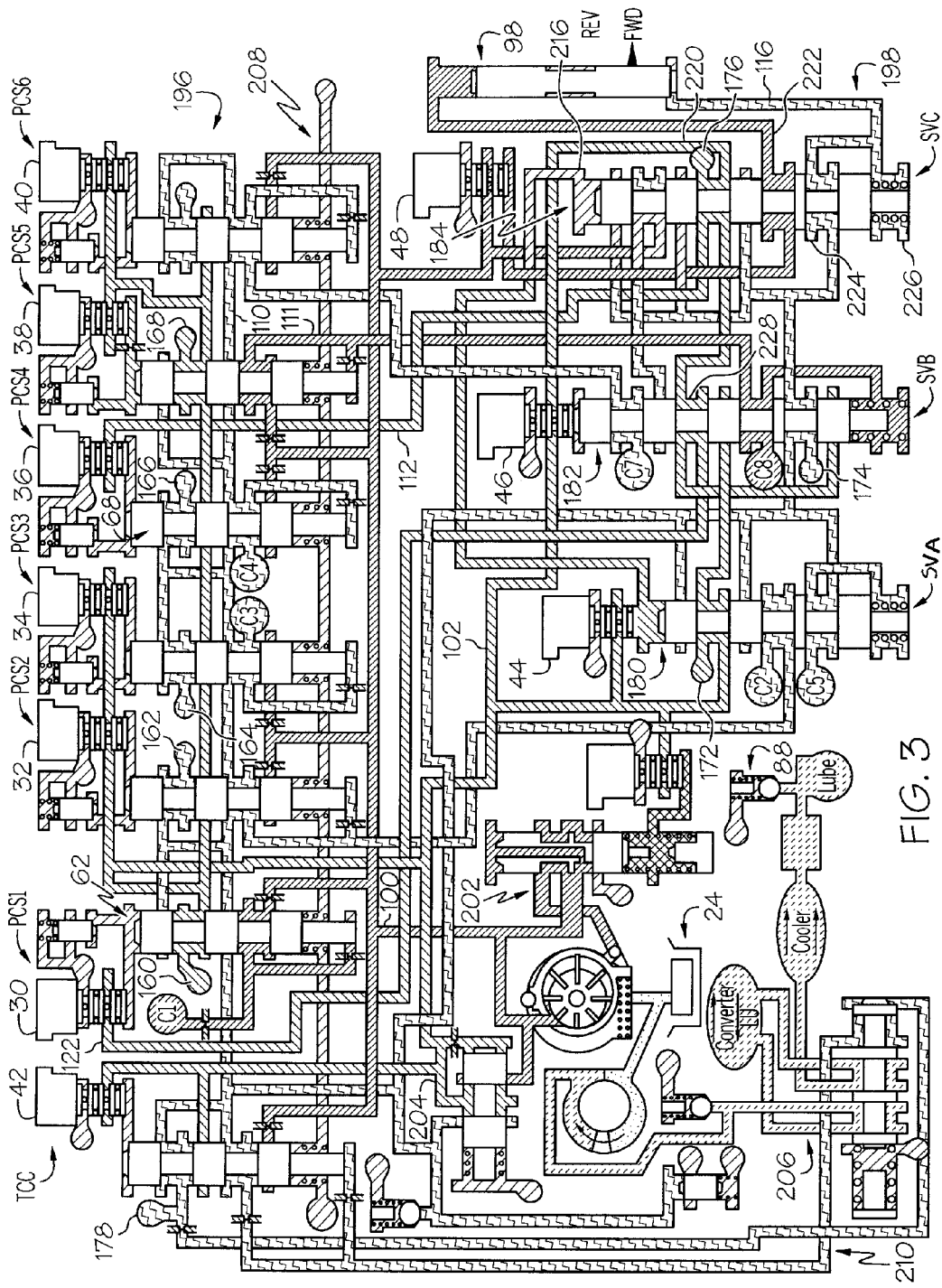
FIG. 3 is a schematic diagram of the embodiment of FIG. 2, showing a configuration of fluid passages and fluid pressures for a first forward ratio.

FIGS. 2-3 illustrate the blocking feature for the PCS4 trim system. Trim system PCS4 normally controls the application of torque transmitting mechanism C4. FIG. 2 illustrates a configuration of control 16 for a neutral range, in which torque transmitting mechanism C4 is not applied. In the neutral range, torque transmitting mechanism C6 is applied and shift fork 98 is in the 'R' position. In the neutral range, all three of shift valve systems SVA, SVB, and SVC are in the destroked or spring set position. As a result, none of the pressure switches 172, 174, 176 are activated. Engagement of the C4 torque transmitting mechanism under these circumstances would cause an undesirable and/or potentially damaging result: the transmission would jump from neutral or reverse to the fourth forward ratio.

In order to prevent engagement of torque transmitting mechanism C4 from the neutral or reverse range, PCS4 actuator feed 112 is in constant fluid communication with pressure switch 176 of shift valve system SVC. When shift valve 184 is destroked, fluid in actuator feed 112 is at exhaust or exhaust backfill pressure. As a result, torque transmitting mechanism C4 cannot be engaged from reverse or neutral when shift valve 184 is destroked, even if actuator 36 is actuated.

Pressure switch 176 is activated when shift valve 184 is stroked. When shift valve 184 is stroked, control pressure is supplied to actuator feed 112. Thus, trim valve 68 is only controllable by actuator 36 when pressure switch 176 is activated. When fluid in actuator feed 112 is at control pressure, application of torque transmitting mechanism C4 is controlled by actuator 36 in the normal way.

FIG. 3 shows a first forward ratio configuration of control 16, in which shift valves 180 and 184 are stroked, trim systems PCS1 and PCS5 are activated, and torque transmitting mechanisms C1 and C6 are applied. Pressure switches 160, 168, 172, and 176 are activated. Since pressure switch 176 is pressurized, actuator feed 112 is at the control pressure. However, torque transmitting mechanism C4 is not engaged because control 22 has not actuated actuator 36. If actuator 36 were to be actuated, fluid at the control pressure would be applied to the head of valve 68, thereby causing valve 68 to translate downwardly in its valve bore. Such downward translation of valve 68 would connect fluid chamber C4 with main pressure passage 100 to apply main pressure to torque transmitting mechanism C4. Such application of pressure would cause torque transmitting mechanism C4 to engage.

As a result of this configuration of fluid passages between shift valve system SVC and trim system PCS4, torque transmitting mechanism C4 is blocked in the neutral and reverse ranges. Even so, skip shifts (e.g., shifts from first forward ratio to third, second to fourth, and the like) are still possible, as shown by Table 1. Use of pressure switch 176 in this way also combines two important functions, clutch blocking and diagnostics, into one fluid circuit. Additionally, space in the valve body is conserved as additional valve length is not needed because fluid passage 112 is arranged to accomplish multiple functions.

Figure 4:
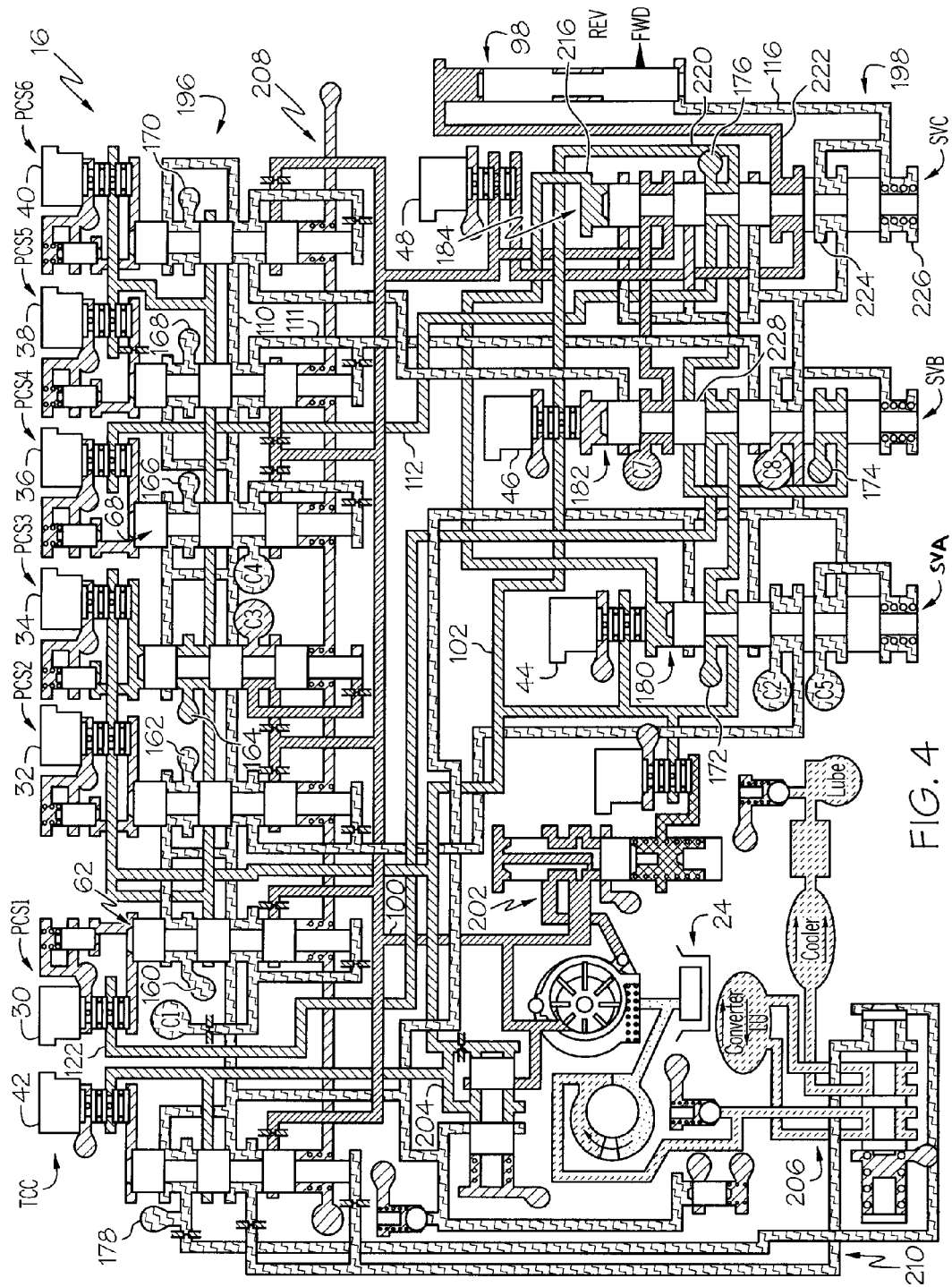
FIG. 4 is a schematic diagram of the embodiment of FIG. 2, showing a configuration of fluid passages and fluid pressures for an eighth forward ratio.
Figure 5:
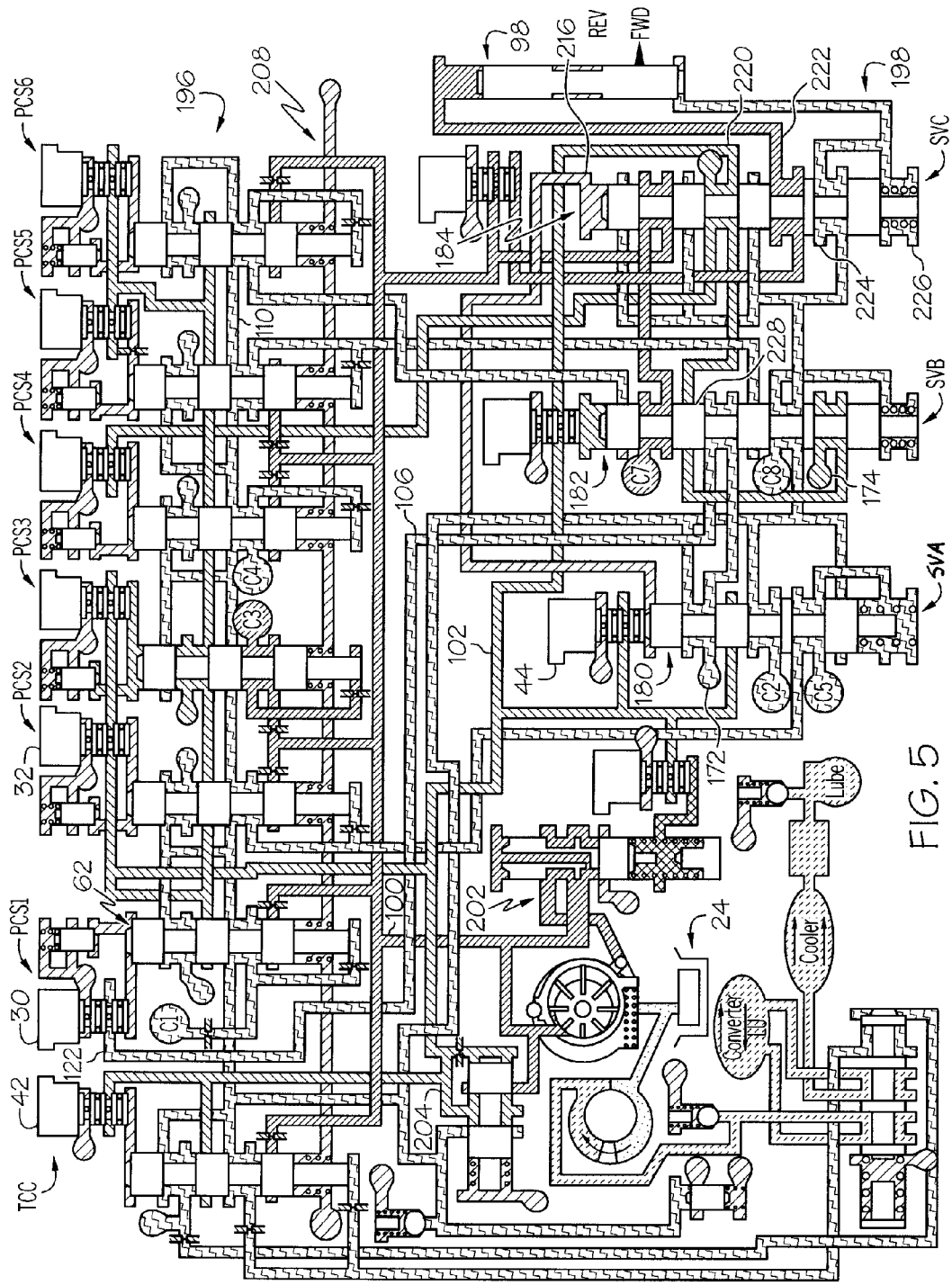
FIG. 5 is a schematic diagram of the embodiment of FIG. 2, showing a configuration of fluid passages and fluid pressures for an alternative eighth forward ratio.
Figure 6:
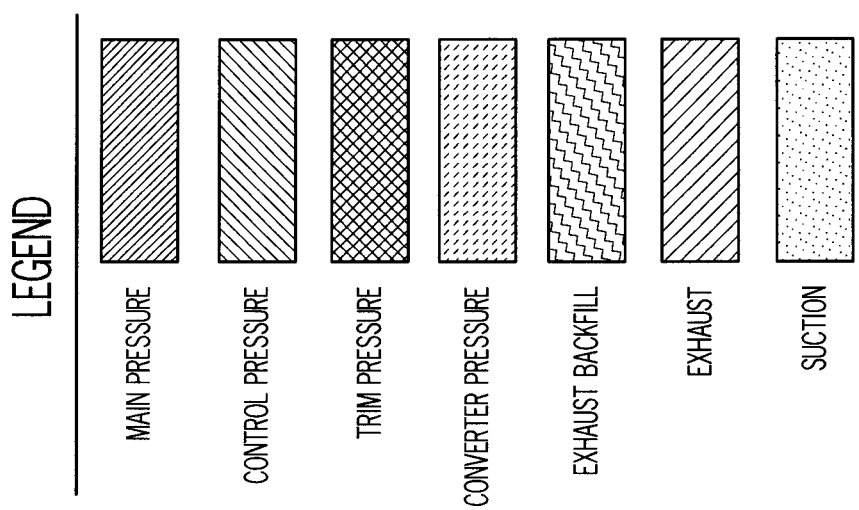
FIG. 6 is a legend showing symbols indicative of various fluid pressures depicted in FIGS. 2-5.

FIGS. 4-5 illustrate a blocking feature for the PCS1 trim system in higher forward ranges. Trim system PCS1 controls application of fluid pressure to torque transmitting mechanism C1. According to the illustrated embodiment (see Table 1 below), torque transmitting mechanism C1 is only engaged in the first and sixth forward ratios. It would be undesirable and/or possibly damaging for torque transmitting mechanism C1 to be inadvertently applied in higher forward speed ratios, particularly eighth and higher forward ratios.

To prevent such an occurrence, actuator feed 122 of trim system PCS1 is in fluid communication with pressure switch 172 of shift valve system SVA, through fluid passage 118 and shift valve system SVB, when shift valve 182 is stroked. As a result, fluid in actuator feed 122 will only be at the control pressure when pressure switch 172 is activated. Pressure switch 172 is only activated when shift valve 180 is stroked. Therefore, when shift valve 180 is destroked and shift valve 182 is stroked, fluid in actuator feed 122 is at exhaust or exhaust backfill pressure, and trim valve 62 cannot be activated, even if actuator 30 is actuated by control 22.

In the example of FIG. 4, control 16 is in a configuration for an eighth forward speed ratio. In the eighth forward ratio of FIG. 4, torque transmitting mechanisms C3 and C7 are engaged. Since trim system PCS3 is activated, pressure switch 164 is activated by the control pressure. Since all three of shift valves 180, 182, 184 are stroked, all three of pressure switches 172, 174, 176 are activated by control pressure. Since shift valve 180 is stroked and pressure switch 172 is pressurized, control pressure is provided to actuator feed 122, and trim valve 62 is under the control of actuator 30. Thus, in the configuration of FIG. 4, torque transmitting mechanism C1 may be applied if actuator 30 is actuated by control 22.

FIG. 5 illustrates an alternative configuration of control 16 for an eighth forward speed ratio, in which trim system PCS3 is activated, shift valves 182 and 184 are stroked, and shift valve 180 is destroked. Torque transmitting mechanisms C3 and C7 are engaged, as in the configuration of FIG. 4. However, the destroking of shift valve 180 does not affect engagement of torque transmitting mechanism C7, thus maintaining the eighth forward ratio.

With shift valve 180 destroked and shift valve 182 stroked, pressure switch 172 is not pressurized. As a result, fluid in actuator feed 122 is not at the control pressure. Thus, trim valve 62 cannot be activated even if actuator 30 is actuated by control 22. Torque transmitting mechanism C1 is thereby blocked and cannot be applied when shift valve 180 is in the destroked position and shift valve 182 is in the stroked position. However, as seen in the example of FIG. 2, torque transmitting mechanism C1 may be applied from the neutral range when both shift valves 180, 182 are destroked, because actuator feed 122 is connected to control pressure through fluid chamber 228 of shift valve 182. Also, as shown in FIG. 3, torque transmitting mechanism C1 may be applied from the first forward range when shift valve 180 is stroked, shift valve 182 is destroked, and shift valve 184 is stroked, because actuator feed 122 is connected to control pressure through fluid chamber 228 of shift valve 182. Trim system PCS1, and therefore torque transmitting mechanism C1, are blocked when shift valves 182, 184 are both stroked, as is the case in the higher forward ranges of the illustrated embodiment.

Another feature of control 16 is the multiplexed trim systems and shift valve systems mentioned above. For example, trim system PCS2 is multiplexed to the C2 and C5 clutches by virtue of its fluid communication with control passage 102 and shift valve system SVA being in fluid communication with fluid chambers C2 and C5, as shown in the figures.

Further, shift valve system SVC is multiplexed to the forward and reverse signals of shift fork 98 as shown. As shown in FIG. 2, when shift fork 98 is in the reverse position, fluid in spring chamber 226 of shift valve system SVC is at the main pressure as a result of the connection of passage 116 to main passage 100 through actuator 48 and fluid chamber 224 and of shift valve 184. Application of main pressure to return spring chamber 226 prevents stroking of shift valve 184 in neutral or reverse ranges. Shift valve 184 is stroked in all forward ranges, however, because passage 116 is at the exhaust or exhaust backfill pressure when shift fork 98 is in the forward position, and main and/or control pressure is applied to other fluid chambers (e.g. fluid chambers 216, 218, 220, 222) of trim valve 184 as shown in FIGS. 3-5.

Additionally, trim systems PCS5 and PCS6 are multiplexed through shift valve system SVB and fluid passages 110, 111. When trim system PCS5 is activated by actuator 38, fluid passage 111 is in fluid communication with main passage 100 and with torque transmitting mechanism fluid chamber C6, through shift valve 182. As a result, main pressure is applied to torque transmitting mechanism C6. When trim system PCS5 is not activated, fluid passage 111 is in fluid communication with fluid passage 110, which is not at that time in fluid communication with main passage 100. As a result, torque transmitting mechanisms C6 and C7 cannot be applied at the same time, unless shift valve 182 is destroked. For example, if shift valve 182 is destroked and trim systems PCS5 and PCS6 are activated, torque transmitting mechanisms C6 and C7 can be applied at the same time. Valve multiplexing may be advantageous to reduce the cost and space required for control 16, as fewer valves are needed.

Control 16 also provides other blocking features for range clutches. For example, in the illustrated embodiment, the C4 torque transmitting mechanism is blocked in the neutral and reverse ranges during power off conditions. This is due to the use of a normally high solenoid for actuator 36. When power is off, actuator 36 will be actuated; however, since actuator feed 112 is connected to pressure switch 176, no control pressure will be applied to trim valve 68 in the neutral or reverse ranges, because shift valve 184 is destroked.

Also, the C6 torque transmitting mechanism is blocked in the upper forward ranges, i.e., sixth forward ratio and higher. This is due to the arrangement of fluid passages 110, 111 described above, and the arrangement of shift valves 182, 184, which only permits torque transmitting mechanism C6 to be engaged if shift valve 182 is destroked (irrespective of the positions of shift valves 180 and 184). Similarly, torque transmitting mechanism C6 cannot be engaged if shift valve 182 is stroked (irrespective of the positions of shift valves 180 and 184).

Control 16 also provides limp home capabilities. In the illustrated embodiment, reverse and neutral ranges fail to neutral; first through fifth forward ratios fail to fourth forward ratio, and sixth through tenth forward ratios fail to ninth forward ratio. This is due to the use of normally high actuators 36, 38, 46, 48 and 138 and the arrangement of fluid passages connecting the trim valves and shift valves. For example, as shown in FIG. 3, a power failure in first forward range would cause torque transmitting mechanism C1 to disengage through deactivation of trim system PCS1, but torque transmitting mechanism C4 would be applied through activation of trim system PCS4 by normally high actuator 36. Torque transmitting mechanism C6 remains applied in power off mode due to normally high actuator 38. A similar result is achieved in the higher ranges, with torque transmitting mechanism C7 remaining applied in power off mode due to normally high actuators 46 and 48.

Table 1 shows the components of control 16 that are actuated when each of the various operational modes of transmission 19 are achieved. Table 1 also shows the gear-shifting torque transmitting mechanisms that are activated in each mode. As noted above, torque converter clutch 15 can be engaged in any range.

TABLE 1

STEADY STATE MECHANIZATION

| Range | Gear-shifting Mechanism(s) Applied | Shift Fork Position | Trim System(s) Actuated | Shift Valve(s) Stroked | Limp Home |
|---|---|---|---|---|---|
| Reverse/ Low | C2, C6 | R | PCS2, PCS5 | A | Neutral |
| Reverse/ High | C2, C7 | R | PCS2, PCS6 | A | Neutral |
| Neutral | C6 | R | PCS5 | None | Neutral |
| $1^{st}$ | C1, C6 | F | PCS1, PCS5 | A, C | $4^{th}$ |
| $2^{nd}$ | C2, C6 | F | PCS2, PCS5 | A, C | $4^{th}$ |
| $3^{rd}$ | C3, C6 | F | PCS3, PCS5 | A, C | $4^{th}$ |
| $4^{th}$ | C4, C6 | F | PCS4, PCS5 | C | $4^{th}$ |
| $5^{th}$ | C5, C6 | F | PCS2, PCS5 | C | $4^{th}$ |
| $6^{th}$ | C1, C7 | F | PCS1, PCS6 | A, B, C | $9^{th}$ |
| $7^{th}$ | C2, C7 | F | PCS2 | A, B, C | $9^{th}$ |
| $8^{th}$ | C3, C7 | F | PCS3 | B, C | $9^{th}$ |
| $9^{th}$ | C4, C7 | F | PCS4 | B, C | $9^{th}$ |
| $10^{th}$ | C5, C7 | F | PCS2 | B, C | 9th |

Additional details of the mechanization of the illustrated embodiment are provided in U.S. Provisional Patent Application Ser. No. 61/109,005. The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. An electrohydraulic control for a multi-speed vehicle transmission, comprising:
a pressure control subassembly, comprising a plurality of pressure control valves including a first pressure control valve and a first electrohydraulic actuator operably coupled to the first pressure control valve, the first electrohydraulic actuator actuatable to apply a first torque transmitting mechanism of the transmission,
a shift valve subassembly, comprising a plurality of shift valves including a first shift valve and a first pressure switch operably coupled to the first shift valve, and
a first fluid connection connecting the first electrohydraulic actuator directly with the first pressure switch,
wherein the first fluid connection connects the first electrohydraulic actuator directly with the first pressure switch to block application of the first torque transmitting mechanism in a non-forward speed ratio of the transmission both when the first electrohydraulic actuator is actuated and when the first electrohydraulic actuator is not actuated.

2. The control of claim 1, wherein the first fluid connection blocks application of the first torque transmitting mechanism in the non-forward speed ratio of the transmission when the first pressure switch is not activated.

3. The control of claim 2, comprising an electrical control including computer circuitry, wherein the electrical control is operably coupled to the first electrohydraulic actuator, and wherein the first fluid connection is configured to enable control of the first pressure control valve by the electrical control only when the first pressure switch is activated.

4. The control of claim 3, wherein the first electrohydraulic actuator is a normally high solenoid.

5. The control of claim 4, comprising a second electrohydraulic actuator operably coupled to the first shift valve.

6. The control of claim 5, wherein the second electrohydraulic actuator is a normally high solenoid.

7. The control of claim 6, wherein the first pressure switch is configured to indicate a shift of the transmission into a forward speed ratio when the first pressure switch is activated.

8. The control of claim 7, wherein the first shift valve is movable between a plurality of positions including a stroked position and a destroked position, and wherein the first pressure switch is activated only when the first shift valve is in the stroked position.

9. The control of claim 8, wherein control of the first pressure control valve by the electrical control is enabled only when the first shift valve is in the stroked position.

10. A control for a multi-speed vehicle transmission, comprising:
a pressure control subassembly, comprising a plurality of pressure control valves including a first pressure control valve, a first electrohydraulic actuator operably coupled to the first control valve, a second pressure control valve, and a second electrohydraulic actuator operably coupled to the second pressure control valve, the first electrohydraulic actuator actuatable to apply a first torque transmitting mechanism of the transmission,
a shift valve subassembly, comprising a plurality of shift valves including a first shift valve and a first pressure switch operably coupled to the first shift valve, and
means for blocking activation of the first pressure control valve unless the first pressure switch is activated,
wherein the means for blocking activation of the first pressure control valve selectively blocks application of the first torque transmitting mechanism when the transmission is in a non-forward speed ratio, and wherein the means for blocking activation of the pressure control valve prevents the first torque transmitting mechanism from being applied both when the first electrohydraulic actuator is actuated and when the first electrohydraulic actuator is not actuated.

11. The control of claim 10, wherein the first electrohydraulic actuator is a normally high solenoid.

12. The control of claim 11, comprising a first fluid connection directly connecting the first electrohydraulic actuator with the first pressure switch.

13. The control of claim 12, wherein the first fluid connection provides the means for blocking activation of the first pressure control valve unless the first pressure switch is activated.

14. The control of claim 13, wherein the first shift valve comprises a valve spool axially translatable in a valve bore of the first shift valve so that the first shift valve is movable between a plurality of positions including a stroked position and a destroked position.

15. The control of claim 14, wherein the first pressure switch is activated only when the first shift valve is in the stroked position.

16. A control for a multi-speed vehicle transmission, comprising:
a pressure control subassembly, comprising a plurality of pressure control valves including a first pressure control valve, a first electrohydraulic actuator operably coupled to the first control valve, a second pressure control valve, and a second electrohydraulic actuator operably coupled to the second pressure control valve,
a shift valve subassembly, comprising a plurality of shift valves including first, second, and third shift valves, and a first pressure switch operably coupled to the first shift valve, and
means for blocking activation of the first pressure control valve unless the first pressure switch is activated,
wherein the pressure control subassembly and the shift valve subassembly are in fluid communication with a plurality of selectively engageable torque transmitting mechanisms of the transmission such that at least one of the electrohydraulic actuators is actuatable to selectively engage a first torque transmitting mechanism, and the means for blocking activation of the first pressure control valve selectively blocks engagement of the first torque transmitting mechanism in a non-forward speed ratio of the transmission both when the at least one of the electrohydraulic actuators is actuated and when the at least one of the electrohydraulic actuators is not actuated.

17. The control of claim 16, comprising a first fluid connection directly connecting the first electrohydraulic actuator with the first pressure switch, wherein the first fluid connection provides the means for blocking the first pressure control valve unless the first pressure switch is activated.

18. The control of claim 17, wherein the first electrohydraulic actuator is a normally high solenoid.

19. The control of claim 18, wherein the first pressure switch is configured to indicate a shift of the transmission into a forward speed ratio when the first pressure switch is activated.

20. The control of claim 19, comprising an electrical control including computer circuitry, wherein the electrical control is operably coupled to the first electrohydraulic actuator, and wherein the first fluid connection is configured to enable control of the first pressure control valve by the electrical control only when the first pressure switch is activated.

* * * * *